S. P. W. Douglass,
Motor.
N°554. Patented Jan. 9, 1838.
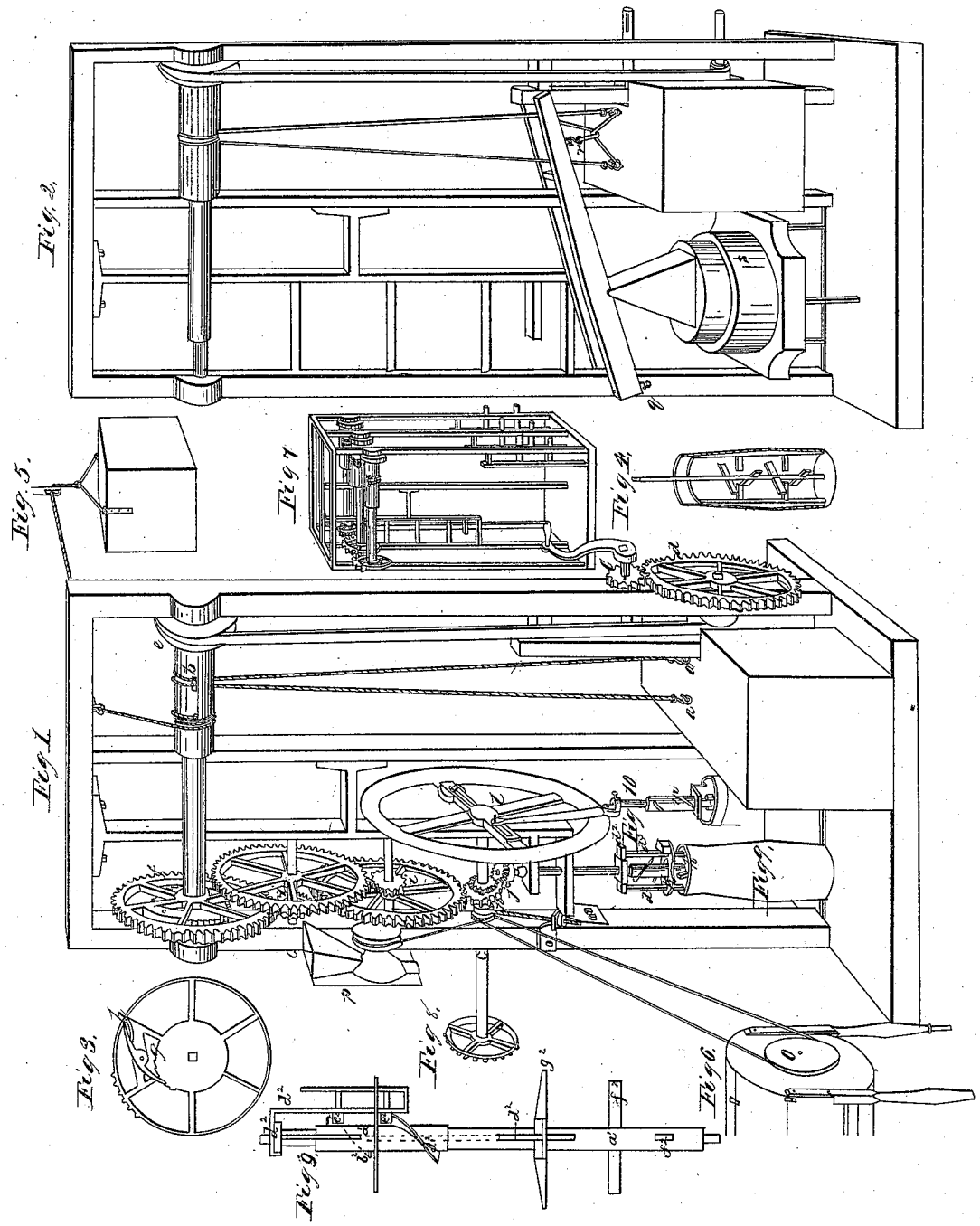

UNITED STATES PATENT OFFICE.

S. P. W. DOUGLASS, OF LANSINGBURGH, NEW YORK.

MODE OF CONSTRUCTING AND OPERATING CHURNS, &c.

Specification of Letters Patent No. 554, dated January 9, 1838.

*To all whom it may concern:*

Be it known that I, STEPHEN P. W. DOUGLASS, of the village of Lansingburgh, formerly of Pittston, in the county of Rensselaer and State of New York, have invented a new and Improved Mode of Constructing Churns Which are to be propelled by Machinery; and I do hereby declare that the following is a full and exact description of my said churn and of the machinery by which it is to be worked.

I provide machinery, which upon the common principles of mechanism is calculated to produce the effects for which it is designed, and then attach to such machinery a body or mass of matter of such weight and elevated to such height as in its descent and by the power of its gravity shall cause the machinery to operate for a given length of time so as to produce the desired result. The weight which thus constitutes the propelling power will necessarily vary according to the circumstances attending its application—such as the space allowed for its elevation and descent, the force required and the time in which that force is to be expended. The means therefore for raising it are left as matters of judgment to the expediency of each particular case, as by a crank connected with a wheel and pinion—a perpetual screw in like connection or any other of the known methods of raising heavy bodies—adapted in respect to mechanical power and form of construction to the exigency of the case whether operated by hand by water or steam or by the application of horse or other animal power.

For affixing my churn I construct a frame of two three or more upright posts from six to ten feet high, according to the height of the apartment in which it is placed connecting them at the top by a beam and at the base by a flooring or platform so as to give them steadiness—adding such fixtures and appendages at discretion as will support and accommodate the machinery. A frame answering to this description is represented in Figures I and II of the annexed drawings. The weight to propel the machinery is elevated by means of a cord chain or the like—attached at one end to the weight as at $a$ $a$ Fig. I and at the other to a cylindrical shaft $b$—placed near the top of the frame, so that by causing the shaft to revolve the cord is wound up upon it and thereby raises the weight. The apparatus for this is a common hand crank applied to a short horizontal shaft fixed in the frame at a convenient height for being turned—and in order to gain power in the gearing for its easy performance, a pinion wheel three inches in diameter is fixed upon the crank shaft so as to mesh with and turn an eighteen-inch cog wheel upon another shaft underneath. These are shown in Fig. I, at $c$ and $d$. One end of a strap, cord or chain is there attached to this lower shaft and the other end to a drum twelve inches in diameter upon the upper shaft directly over it as at $e$, in such manner as that when the weight is down the strap shall have been wound up on the drum—having become so (if the machine has been in operation) by the running down of the weight. Then by turning the crank, the strap is again wound around the lower shaft. This by its draft turns back the drum and with it the upper shaft and draws up the weight. After which the pinion upon the crank shaft is thrown out of gear of the cog wheel with which it acts by sliding it back toward the crank—a length of shaft being provided for that purpose with a feather on the shaft to correspond with a groove in the pinion which prevents either from revolving without the other as seen upon the crank shaft. This allows the strap to render easily to the returning process of being wound up upon the drum and leaves the weight suspended and its gravitating power upon the shaft unobstructed by the crank or its appendages—except a moderate friction provided for in the lower shaft to keep the strap in tension sufficiently for its being snugly wound upon the drum. A ratchet wheel and catch in connection with a cog wheel as seen at $f$, hold the weight in this suspension as well as in every part of its ascent against turning back. The ratchet is fixed upon the shaft and turns with it—while the cog wheel, being in gear with the machinery in connection, remains stationary—the aperture in its center being such as to allow the shaft to turn within it in the direction of its winding up and the catch to the ratchet being attached to the cog wheel prevents it from turning the other way. Fig. III is a front view of these and shows the manner in which the catch is attached to the wheel as at $g$ and a small spring $h$, to preserve its bearing upon the ratchet. By these means the entire power of the weight in its reaction is brought upon the wheel and the machinery connected with it—causing the whole to revolve as the shaft revolves in this reversed direction. In order to obtain in the result from this power, time and motion adapted to the process of churning, and at the same time give to the machine in the relative proportions and arrangements of its gearing a convenient form as a domestic article, I provide three cog wheels including that already mentioned upon the upper shaft, each eighteen inches in diameter and each meshing with and turning a pinion wheel three inches in diameter upon an horizontal shaft underneath in connection upon the same shaft (except the last) with the next eighteen inch wheel in the series as shown at $i$, $i$, Fig. I. On the shaft with the last pinion is a miter or bevel wheel in gear with another of like dimensions upon a vertical shaft as at $j$. This is for the purpose of giving rotary motion to an upright dasher in the churn upon the platform underneath as at $k$. The vertical shaft and dasher are connected by a movable socket as at $v$ upon one, and a tenon termination of the other to fit it, or by a coupling box or such other provisions as are common for like purposes.

The rotary dasher is provided with arms paddles or the like extending out from its shaft or otherwise at discretion, and the churn with stationary arms or breaks fixed to two or more vertical pieces placed against the sides of the churn in the inside as shown in a sectional view in Fig. IV, letters $t$, $t$. These as well as the arms of the dasher being for the purpose of agitating the cream or milk in churning are disposed so as to divide the distance from top to bottom about equally. The stationary side pieces are secured by a perforation for each, as a socket in the bottom of the churn to which the foot of the piece is fitted and the top is fastened by a slide, pin or catch made movable so as to allow the piece to be taken out as occasion may require.

I also provide for churning with this machine by the usual up and down motion of a common dasher. This is effected by any of the known methods of changing a rotary motion into one that is reciprocating. I have here preferred the crank operation. It is communicated to the dasher by a connecting rod in the usual way. This crank or its substitute in connection with a balance wheel to equalize its motion is attached to the horizontal shaft of the bevel wheel and consists of a pin eccentrically placed in the side of the balance wheel extending out so as to receive the upper end of the connecting rod. The lower end of the rod is attached to the staff of the dasher by a pin or other flexible joint. The eccentric pin as seen at 1, I have fixed in one of the arms of the balance wheel and by means of a slot or groove it is made movable in the direction of the radius of the wheel and by a screw is fixed at a greater or less distance from the center so as to adapt its sweep to the extent of motion required for the dasher. A weight as a counter balance to that of the connecting rod and dasher is attached to the opposite arm of the wheel with like provision, for moving it to or from the center so as to correspond with the position of the pin in that respect. The staff of the dasher is kept in its vertical position and its up and down motion preserved in that direction by means of two or more sheaves connected with the top of the churn as at $m$, or by any other of the known methods of producing the same result. When this mode of churning is used the bevel wheel upon the vertical shaft is thrown or dropped out of gear. And when the rotary dasher is used the connecting rod is taken from the crank—provision being made for both of these purposes. Or by adding sufficient weight to the operating power, for which provision is also made as will hereinafter be described, churning is performed in both modes at once where occasion requires.

The movement of the machinery and by it that of the dashers is regulated and adapted to the known process of churning or the machine stopped by means of a common friction band with an adjusting screw applied to the lower horizontal shaft or to a pulley thereupon as shown at $n$. It being calculated from experiments actually made that under the advantages provided for in the crank apparatus a weight can be raised six feet by a woman of ordinary strength or a sturdy boy ten years old in one and a half minutes or by a man in half a minute, which in once running down, will be sufficient to operate the machine when thus regulated three quarters of an hour producing about thirteen hundred revolutions of the rotary dasher, or an equal number of strokes of the other—and so as to churn effectually twenty gallons of cream. When, in order to obtain a greater elevation of the weight, or from any other consideration it becomes desirable, I provide for raising it without the apartment in which the machine is placed—connecting it with the upper shaft by a cord or the like upon the principles represented by the spspended weight and cord attached marked as Fig. V, or by extending the upper shaft so as to produce the same effect. In changing the direction of the cord for this purpose I fix pulleys as circumstances require for its easy rendering as is common in like cases.

Whenever it becomes expedient to make use of one or more additional weights, I provide an additional shaft for each additional weight, and connect them by a cog wheel upon each, with the cog wheel upon the principal shaft if placed parallel thereto in such manner as that by showing either of the added shafts in end or sliding the wheel upon the shaft it is thereby placed in or out of gear at pleasure—provision being made for this purpose. In this connection with the principal shaft the gravity of all is brought to bear upon the machinery the same as one. The manner of effecting this is shown in Fig. VII, with a frame constructed for the support of two additional shafts and to accommodate an apparatus for raising a weight connected with each in the same manner as that above described with the principal shaft. The same thing is also effected by extending the upper shaft in length and connecting therewith the added shaft and weight appended thereto by means of a common coupling box—in the same lengthwise extension.

Having thus fully described the kind of machinery by which I intend to operate upon my improved churn, in which the dashers are to receive a revolving motion, and also a reciprocating motion, up and down, simultaneously, in which my claim to improvement specially consists, I now proceed to describe more particularly the arrangement of the dasher and churn by which these motions are obtained, referring therefor to Figs. IX and X, in drawings, A, and B, which are two modifications of my mode of producing said motions; in the latter of which drawings the body of the churn is altogether omitted. In Fig. IX $a'$, $a'$, is the shaft to which a revolving motion is given by the machinery herein described, or by other means; upon this shaft, above the body of the churn, there are placed spiral, or helical wings $b^2$, $b^2$, the lower segment of which helix, as the shaft revolves is brought into contact with a friction roller $c^2$, affixed upon a part of the sliding frame. This causes the sliding frame $d^2$, to rise until it arrives at a break in the helix, when the dasher falls by its own weight or by being loaded, or is carried down by the upper helix coming into contact with a second friction roller $e^2$. The dasher arms $f^2$, $f$, merely revolve, the dasher $g^2$ being the one which rises and falls with the sliding frame $d^2$, to which it is attached, and which is prevented from revolving by its uprights, which pass through mortises in the lid of the churn $h^2$. In this modification the lower end of the shaft revolves in a step at the bottom of the churn. In my second modification, Fig. X, the whole dasher rises and falls by a reciprocating rotary motion, $i^2$, $i^2$, is a tube of metal affixed to the top of the churn, and through which the shaft $j^2$, $j^2$, works freely. The tube has a spiral slot $k^2$ through it, which admits a pin $l^2$, or friction roller affixed to the staff or shaft $j^2$. This shaft is made to rise and fall by a crank motion, which from the arrangement described produces the desired effect.

What I claim as my invention is—

The giving a rotary and vertical motion to the dasher of the churn, substantially in the manner herein described.

STEPHEN P. W. DOUGLASS.

Witnesses:
CLEMENT F. FOOTE,
LINTON THORN.